(12) United States Patent
Abiko et al.

(10) Patent No.: US 12,163,048 B2
(45) Date of Patent: Dec. 10, 2024

(54) POLYIMIDE RESIN, VARNISH, AND POLYIMIDE FILM

(71) Applicant: MITSUBISHI GAS CHEMICAL COMPANY, INC., Tokyo (JP)

(72) Inventors: Yohei Abiko, Kanagawa (JP); Aoi Daito, Kanagawa (JP); Shinji Sekiguchi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 839 days.

(21) Appl. No.: 17/292,538

(22) PCT Filed: Nov. 12, 2019

(86) PCT No.: PCT/JP2019/044365
§ 371 (c)(1),
(2) Date: May 10, 2021

(87) PCT Pub. No.: WO2020/100904
PCT Pub. Date: May 22, 2020

(65) Prior Publication Data
US 2021/0395568 A1  Dec. 23, 2021

(30) Foreign Application Priority Data

Nov. 16, 2018  (JP) .................... 2018-215826

(51) Int. Cl.
*C09D 7/20* (2018.01)
*C08G 73/10* (2006.01)
*C09D 179/08* (2006.01)

(52) U.S. Cl.
CPC ....... *C09D 179/08* (2013.01); *C08G 73/1032* (2013.01); *C08G 73/1042* (2013.01);
(Continued)

(58) Field of Classification Search
CPC ............ C08G 73/1042; C08G 73/1007; C08G 73/1046; C08G 73/1071; C08G 73/106; C09D 179/08
See application file for complete search history.

(56) References Cited

U.S. PATENT DOCUMENTS

2004/0265731 A1  12/2004  Okada et al.

FOREIGN PATENT DOCUMENTS

CN   1810856 A   8/2006
CN   104854165 A  8/2015
(Continued)

OTHER PUBLICATIONS

CN105461923B English Translation (Year: 2018).*
(Continued)

*Primary Examiner* — Catherine S Branch
*Assistant Examiner* — Huihong Qiao
(74) *Attorney, Agent, or Firm* — GREENBLUM & BERNSTEIN, P.L.C.

(57) ABSTRACT

A polyimide resin includes structural unit A derived from tetracarboxylic dianhydride and structural unit B derived from diamine, wherein unit A includes at least one unit selected from the group consisting of unit (A-1) derived from a compound represented by Formula (a-1) and unit (A-2) derived from a compound represented by Formula (a-2), and unit B includes unit (B-1) derived from a compound represented by Formula (b-1) and includes unit (B-2) derived from a compound represented by Formula (b-2).

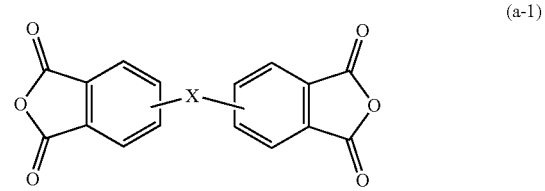

(a-1)

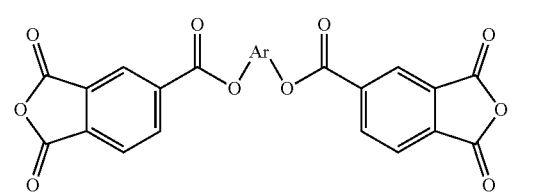

(a-2)

wherein X represents a single bond or an oxygen atom, and Ar represents a substituted or unsubstituted arylene group.

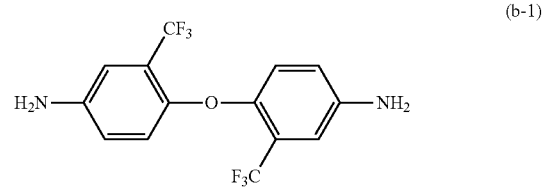

(b-1)

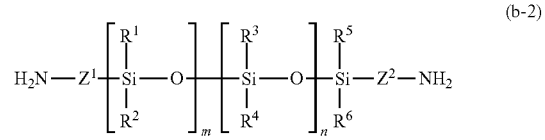

(b-2)

wherein $Z^1/Z^2$ represent a divalent aliphatic or aromatic group, $R^1/R^2$ represent a monovalent aromatic or aliphatic group, $R^3/R^4$ represent a monovalent aliphatic group, $R^5/R^6$ represent a monovalent aliphatic or aromatic group, m&n represent an integer of 1 or greater, and a sum of m+n represents an integer from 2-1000.

10 Claims, No Drawings

(52) U.S. Cl.
CPC ....... *C08G 73/1046* (2013.01); *C08G 73/106* (2013.01); *C08G 73/1071* (2013.01); *C09D 7/20* (2018.01)

(56) References Cited

FOREIGN PATENT DOCUMENTS

| | | | |
|---|---|---|---|
| CN | 105461923 B | * 1/2018 | ............. C08G 73/10 |
| CN | 110229340 A | 9/2019 | |
| JP | 5-178991 A | 7/1993 | |
| JP | 2005-232383 A | 9/2005 | |
| JP | 2008-304569 A | 12/2008 | |
| JP | 5148760 B2 | 2/2013 | |
| JP | 2016-029126 A | 3/2016 | |
| JP | 2018 003009 A | 1/2018 | |
| JP | 2019-203117 A | 11/2019 | |
| KR | 10-2004-0058259 A | 7/2004 | |
| TW | 200925182 | 6/2009 | |
| WO | 2014/098235 A1 | 6/2014 | |
| WO | 2016-046997 A1 | 3/2016 | |

OTHER PUBLICATIONS

International Search Report issued in International Patent Application No. PCT/JP2019/044365, dated Dec. 24, 2019, along with English translation thereof.

Written Opinion of the International Searching Authority issued in International Patent Application No. PCT/JP2019/044365, dated Dec. 24, 2019, along with English translation thereof.

* cited by examiner

POLYIMIDE RESIN, VARNISH, AND POLYIMIDE FILM

TECHNICAL FIELD

The present invention relates to a polyimide resin, varnish, and a polyimide film.

BACKGROUND ART

Various uses of polyimide resins in the fields of electrical and electronic components and the like have been studied. For example, it is desirable to replace a glass substrate used in an image display device such as a liquid crystal display and an OLED display with a plastic substrate, for the purpose of reducing the weight of the device and imparting flexibility to the device, and a polyimide film suitable as the plastic substrate is under research. High transparency is required for the polyimide film for such applications.

In addition, in a case where the varnish applied on a glass support or a silicon wafer is heat-cured to form a polyimide film, the polyimide film may have a residual stress. When the residual stress of the polyimide film is large, the glass support and the silicon wafer may be warped undesirably. Thus, suppression of the residual stress is also required for the polyimide film.

Furthermore, the polyimide film is required to have a small phase difference due to birefringence, and a small retardation as required characteristics.

Patent Document 1 discloses, as a polyimide resin with which a film having a low residual stress can be provided, a polyimide resin synthesized by using α,ω-aminopropyl polydimethylsiloxane and 4,4'-diaminodiphenylether as a diamine component.

Patent Document 2 discloses, as a polyimide film having a low residual stress, a polyimide film formed by imidizing a polyimide resin precursor synthesized by using bistrifluoromethylbenzidine as a diamine component and silicon-containing diamines.

CITATION LIST

Patent Documents

Patent Document 1: JP 2005-232383 A
Patent Document 2: WO 2014/098235

SUMMARY OF INVENTION

Technical Problem

As described above, various properties are required for polyimide films, but it is not easy to satisfy these properties simultaneously. In particular, it was difficult to achieve a low residual stress and low retardation properties in a compatible manner.

The present invention has been made in view of such circumstances, and an object of the present invention is to provide a polyimide resin having excellent high transparency and capable of forming a film exhibiting low retardation and a low residual stress, varnish containing a precursor of the polyimide resin, and a polyimide film containing the polyimide resin.

Solution to Problem

The inventors of the present invention have found that the problems described above can be solved by a polyimide resin containing a combination of particular structural units and thus have completed the present invention.

That is, the present invention relates to the following (1) to (10).

(1)

A polyimide resin including a structural unit A derived from a tetracarboxylic dianhydride and a structural unit B derived from diamine, wherein the structural unit A includes at least one structural unit selected from the group consisting of a structural unit (A-1) derived from a compound represented by Formula (a-1) below and a structural unit (A-2) derived from a compound represented by Formula (a-2) below, and the structural unit B includes a structural unit (B-1) derived from a compound represented by Formula (b-1) below and includes a structural unit (B-2) derived from a compound represented by Formula (b-2) below.

[Chem. 1]

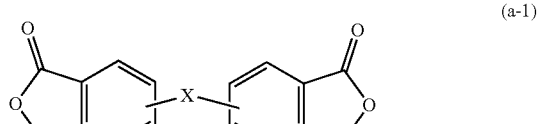

(a-1)

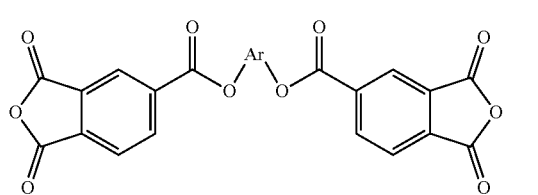

(a-2)

(In Formula (a-1), X represents a single bond or an oxygen atom. In Formula (a-2), Ar represents a substituted or unsubstituted arylene group.)

[Chem. 2]

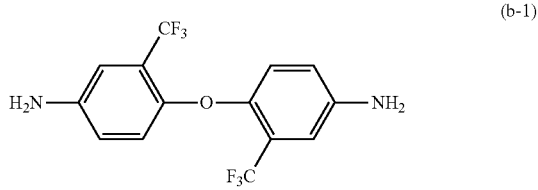

(b-1)

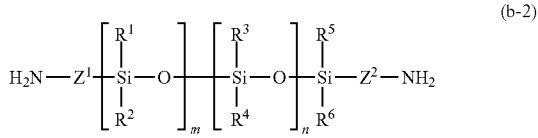

(b-2)

(In Formula (b-2), $Z^1$ and $Z^2$ each independently represent a divalent aliphatic group or a divalent aromatic group, $R^1$ and $R^2$ each independently represent a monovalent aromatic group or a monovalent aliphatic group, $R^3$ and $R^4$ each independently represent a monovalent aliphatic group, $R^5$ and $R^6$ each independently represent a monovalent aliphatic group or a monovalent aromatic group, m and n each independently represent an integer of 1 or greater, and a sum of m and n represents an integer from 2 to 1000. Here, at least one of $R^1$ and $R^2$ represents a monovalent aromatic group.)

(2)
The polyimide resin according to (1), wherein the structural unit (A-1) includes at least one structural unit selected from the group consisting of a structural unit derived from a compound represented by Formula (a-1-1) below, and a structural unit derived from a compound represented by Formula (a-1-2) below.

[Chem. 3]

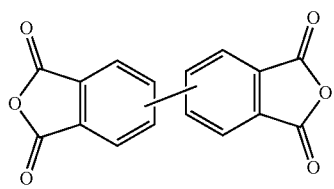

(a-1-1)

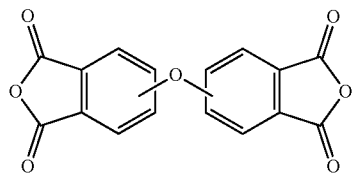

(a-1-2)

(3)
The polyimide resin according to (1) or (2), wherein the structural unit (A-2) includes at least one structural unit selected from the group consisting of a structural unit derived from a compound represented by Formula (a-2-1) below, and a structural unit derived from a compound represented by Formula (a-2-2) below.

[Chem. 4]

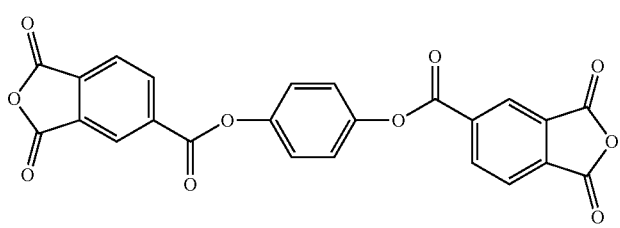

(a-2-1)

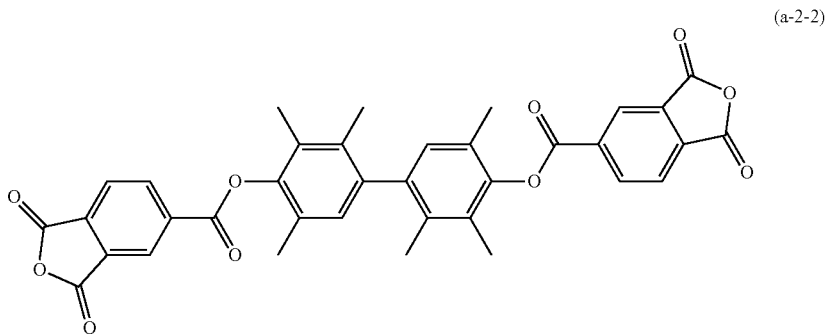

(a-2-2)

(4)

The polyimide resin according to any one of (1) to (3), wherein a content of a polyorganosiloxane unit with respect to a total of the structural unit A and the structural unit B is from 5 to 45 mass %.

(5)

The polyimide resin according to any one of (1) to (4), wherein a ratio of the structural unit (B-2) in the structural unit B is from 0.01 to 15 mol %.

(6)

The polyimide resin according to any one of (1) to (5), wherein a sum of m and n in the Formula (b-2) is an integer from 3 to 500.

(7)

The polyimide resin according to any one of (1) to (6), wherein the structural unit A includes a structural unit (A-3) derived from a compound represented by Formula (a-3) below.

[Chem. 5]

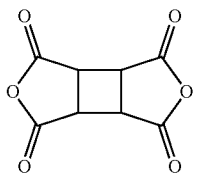

(a-3)

(8)

The polyimide resin according to any one of (1) to (7), wherein the structural unit A includes a structural unit (A-4) derived from a compound represented by Formula (a-4) below.

[Chem. 6]

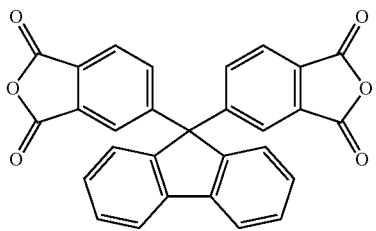

(a-4)

(9)

A varnish in which polyamic acid, which is a precursor of the polyimide resin described in any one of (1) to (8), is dissolved in an organic solvent.

(10)

A polyimide film including the polyimide resin described in any one of (1) to (8) above.

Advantageous Effects of Invention

According to the present invention, a polyimide resin having excellent high transparency, with which a film exhibiting low retardation and a low residual stress can be formed, varnish containing a precursor of the polyimide resin, and a polyimide film containing the polyimide resin are provided.

DESCRIPTION OF EMBODIMENTS

[Polyimide Resin]

A polyimide resin according to an embodiment of the present invention includes a structural unit A derived from a tetracarboxylic dianhydride and a structural unit B derived from diamine, wherein the structural unit A includes at least one structural unit selected from the group consisting of a structural unit (A-1) derived from a compound represented by Formula (a-1) below and a structural unit (A-2) derived from a compound represented by Formula (a-2) below, and the structural unit B includes a structural unit (B-1) derived from a compound represented by Formula (b-1) below and includes a structural unit (B-2) derived from a compound represented by Formula (b-2) below.

[Chem. 7]

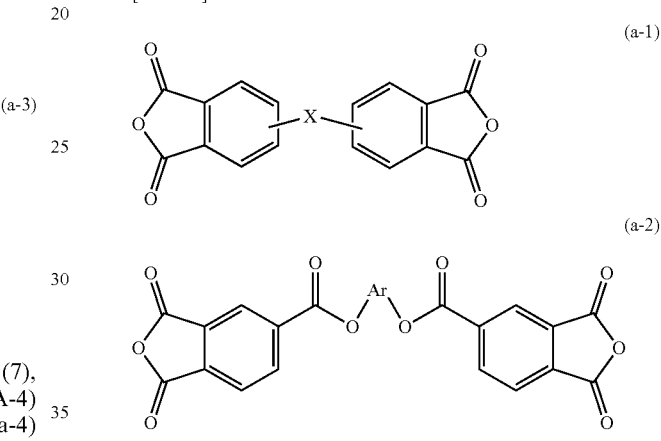

(In Formula (a-1), X represents a single bond or an oxygen atom. In Formula (a-2), Ar represents a substituted or unsubstituted arylene group.)

[Chem. 8]

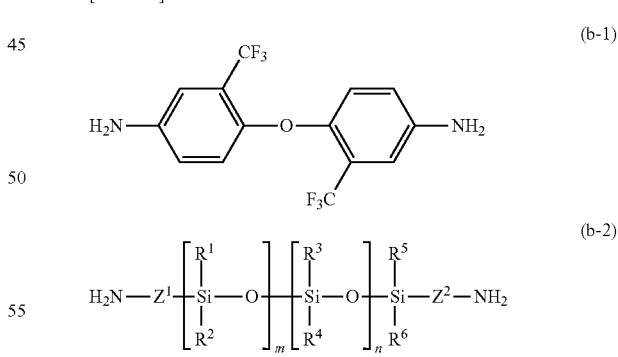

(In Formula (b-2), $Z^1$ and $Z^2$ each independently represent a divalent aliphatic group or a divalent aromatic group, $R^1$ and $R^2$ each independently represent a monovalent aromatic group or a monovalent aliphatic group, $R^3$ and $R^4$ each independently represent a monovalent aliphatic group, m and n each independently represent an integer of 1 or greater, and a sum of m and n represents an integer from 2 to 1000. However, at least one of $R^1$ and $R^2$ represents a monovalent aromatic group.)

<Structural unit A>

The structural unit A is a structural unit derived from a tetracarboxylic dianhydride in the polyimide resin, and the structural unit A includes at least one structural unit selected from the group consisting of a structural unit (A-1) derived from a compound represented by Formula (a-1) below and a structural unit (A-2) derived from a compound represented by Formula (a-2) below.

[Chem. 9]

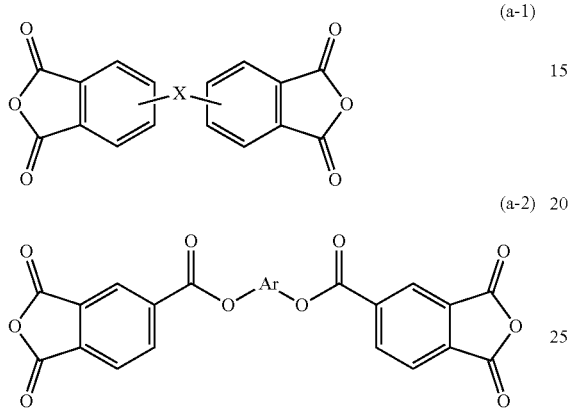

(a-1)

(a-2)

In Formula (a-1), X represents a single bond or an oxygen atom. In Formula (a-2), Ar represents a substituted or unsubstituted arylene group.

Examples of the compound represented by Formula (a-1) include a compound represented by Formula (a-1-1) below and a compound represented by Formula (a-1-2) below. That is, examples of the structural unit (A-1) include at least one structural unit selected from the group consisting of a structural unit derived from a compound represented by Formula (a-1-1) below, and a structural unit derived from a compound represented by Formula (a-1-2) below. One type of these structural units in the structural unit (A-1) may be used alone, or two or more types thereof may be used in combination in any proportion.

[Chem. 10]

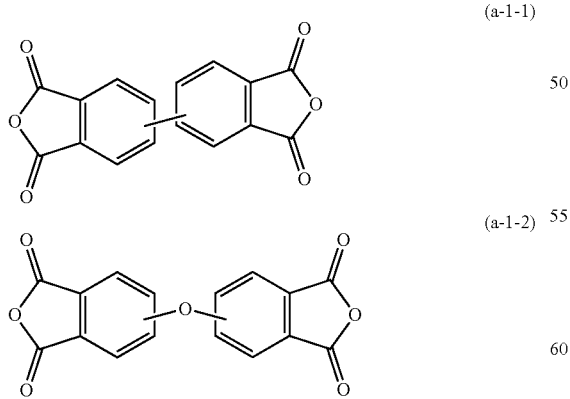

(a-1-1)

(a-1-2)

The compound represented by Formula (a-1-1) is a biphenyltetracarboxylic dianhydride (BPDA), and specific examples thereof include 3,3',4,4'-biphenyltetracarboxylic dianhydride (s-BPDA) represented by Formula (a-1-1s) below, 2,3,3',4'-biphenyltetracarboxylic dianhydride (a-BPDA) represented by Formula (a-1-1a) below, and 2,2',3,3'-biphenyltetracarboxylic dianhydride (i-BPDA) represented by Formula (a-1-1i). Among these, 3,3',4,4'-biphenyltetracarboxylic dianhydride (s-BPDA) represented by Formula (a-1-1s) below is preferable.

[Chem. 11]

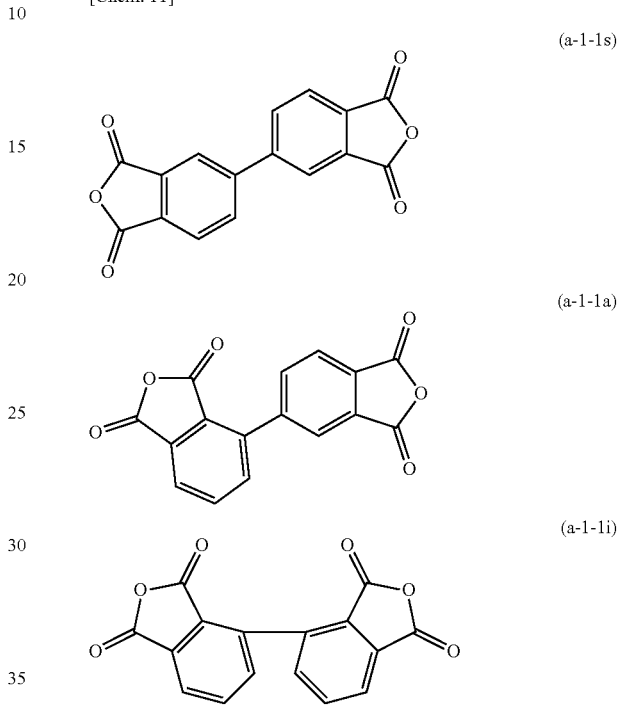

(a-1-1s)

(a-1-1a)

(a-1-1i)

The compound represented by Formula (a-1-2) is an oxydiphthalic anhydride (ODPA), and specific examples thereof include 4,4'-oxydiphthalic anhydride (s-ODPA) represented by Formula (a-1-2s) below, 3,4'-oxydiphthalic anhydride (a-ODPA) represented by Formula (a-1-2a) below, and 3,3'-oxydiphthalic anhydride (i-ODPA) represented by Formula (a-1-2i). Among these, 4,4'-oxydiphthalic anhydride (s-ODPA) represented by Formula (a-1-2s) is preferable.

[Chem. 12]

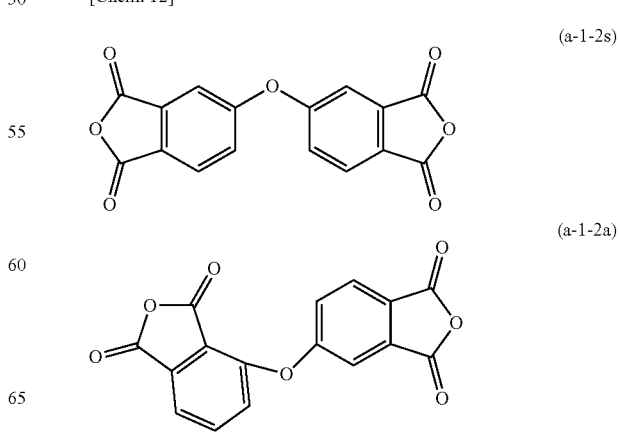

(a-1-2s)

(a-1-2a)

-continued (a-1-2i)

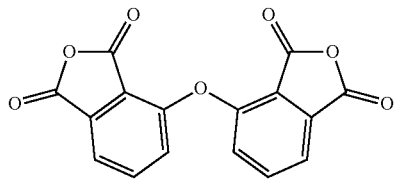

When the structural unit A includes a structural unit derived from the compound represented by Formula (a-1-1), heat resistance and thermal stability of the film are improved, and residual stress is further reduced.

When the structural unit A includes a structural unit derived from the compound represented by Formula (a-1-2), the residual stress and retardation are further reduced and colorlessness is also improved.

[Chem. 13]

(a-2)

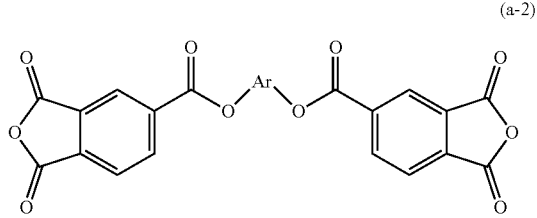

In Formula (a-2) above, Ar may be an unsubstituted arylene group or a substituted arylene group. The substituted arylene group means a group in which a hydrogen atom of the unsubstituted arylene group is substituted with an optional substituent.

Examples of the unsubstituted arylene group in Ar include an o-phenylene group, a m-phenylene group, a p-phenylene group, a 4,4'-biphenylene group, and a 2,6-naphthylene group. Among these, a p-phenylene group and a 4,4'-biphenylenylene group are preferable.

Examples of the substituent group in the substituted arylene group include an alkyl group having 1 to 8 carbon atoms, a halogen atom (fluorine atom, chlorine atom, bromine atom, iodine atom), and a halogenated alkyl group in which a hydrogen atom of the alkyl group is substituted with a halogen atom. Among these, a methyl group is preferable. The number of optional substituents may be one or two or more. When there are two or more substituents, the substituents may be the same as or different from each other.

Specific examples of the substituted arylene group include a 2,2',3,3',5,5'-hexamethyl-4,4'-biphenylenylene group.

Ar is preferably a p-phenylene group, a 2,2',3,3',5,5'-hexamethyl-4,4'-biphenylenylene group.

The number of carbon atoms of the substituted or unsubstituted arylene group (not including the number of carbon atoms of the substituent) is preferably from 6 to 20, and more preferably from 6 to 12.

Suitable examples of the compound represented by Formula (a-2) include a compound represented by Formula (a-2-1) below and a compound represented by Formula (a-2-2) below. That is, as the structural unit (A-2), it is preferable to include at least one structural unit selected from the group consisting of a structural unit derived from a compound represented by Formula (a-2-1) below, and a structural unit derived from a compound represented by Formula (a-2-2) below. The structural unit (A-2) may be used alone, or two or more types thereof may be used in combination in any proportion.

[Chem. 14]

(a-2-1)

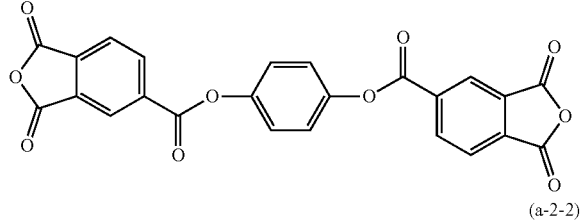

(a-2-2)

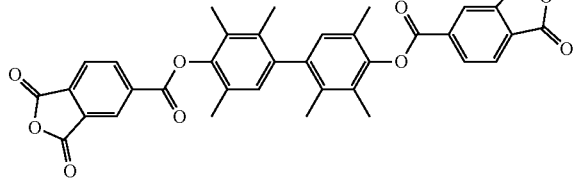

The compound represented by Formula (a-2-1) is p-phenylenebis(trimeritate) dianhydride (TAHQ). The compound represented by Formula (a-2-2) is a compound disclosed in WO 2014/046180, which is represented by the abbreviation of TMPBP-TME in the present specification.

When the structural unit A includes the structural unit derived from the compound represented by Formula (a-2-1), the residual stress is further reduced.

When the structural unit A includes the structural unit derived from the compound represented by Formula (a-2-2), the colorless transparency of the film is further improved.

The structural unit A may include both the structural unit (A-1) and the structural unit (A-2), and may include either the structural unit (A-1) or the structural unit (A-2). The structural unit (A-1) is preferable from the viewpoint of further reduction of the residual stress, and the structural unit (A-2) is preferable from the viewpoint of reduction of YI and excellent colorless transparency.

When the structural unit A includes either the structural unit (A-1) or the structural unit (A-2), the proportion of the structural unit (A-1) or the structural unit (A-2) in the structural unit A is preferably 45 mol % or greater, more preferably 70 mol % or greater, still more preferably 90 mol % or greater, and particularly preferably 99 mol % or greater. Furthermore, the upper limit for the proportion is not particularly limited and is 100 mol % Similarly, the proportion of the structural unit (A-1) or the structural unit (A-2) in the structural unit A is preferably from 45 to 100 mol %, more preferably from 70 to 100 mol %, still more preferably from 90 to 100 mol %, and particularly preferably from 99 to 100 mol %. That is, the structural unit (A) may consist of either the structural unit (A-1) only or the structural unit (A-2) only.

When the structural unit A includes both of the structural unit (A-1) and the structural unit (A-2), the proportion of the structural unit (A-1) in the structural unit A is preferably from 10 to 90 mol %, more preferably from 20 to 80 mol %, and still more preferably from 40 to 60 mol %.

The proportion of the structural unit (A-2) in the structural unit A is preferably from 10 to 90 mol %, more preferably from 20 to 80 mol %, and still more preferably from 40 to 60 mol %.

The total proportion of the structural unit (A-1) and the structural unit (A-2) in the structural unit A is preferably from 50 mol % or greater, more preferably 70 mol % or greater, still more preferably 90 mol % or greater, and particularly preferably 99 mol % or greater. The upper limit for the total proportion of the structural units (A-1) and (A-2) is not particularly limited and is 100 mol % That is, the structural unit (A) may consist of only the structural unit (A-1) and the structural unit (A-2).

The structural unit A may include a structural unit (A-3) derived from a compound represented by Formula (a-3), besides the structural unit (A-1) and the structural unit (A-2). From the viewpoint of improving the heat resistance and achieving low retardation, it is preferable to include a structural unit (A-3).

[Chem. 15]

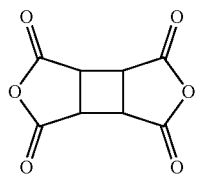

(a-3)

The compound represented by Formula (a-3) is 1,2,3,4-cyclobutanetetracarboxylic dianhydride (CBDA).

The structural unit A may include a structural unit (A-4) derived from a compound represented by Formula (a-4), besides the structural unit (A-1) and the structural unit (A-2). From the viewpoint of improving the heat resistance and achieving the low retardation, it is preferable to include a structural unit (A-4).

[Chem. 16]

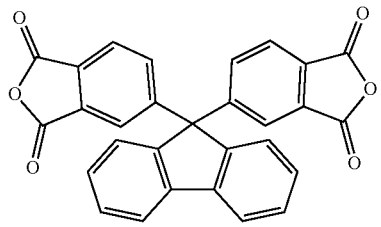

(a-4)

The compound represented by Formula (a-4) is 9,9'-bis (3,4-dicarboxyphenyl) fluorene dianhydride (BPAF).

The structural unit A may include structural units besides the structural unit (A-1), the structural unit (A-2), the structural unit (A-3), and the structural unit (A-4) within a range that does not impair the effects of the present invention. The tetracarboxylic dianhydride providing such a structural unit is not particularly limited, and examples thereof include aromatic tetracarboxylic dianhydrides such as pyromellitic dianhydride, 4,4'-(hexafluoroisopropylidene) diphthalic anhydride, 3,3',4,4'-diphenylsulfonetetracarboxylic dianhydride, 3,3',4,4'-benzophenonetetracarboxylic dianhydride, and 2,2',3,3'-benzophenonetetracarboxylic dianhydride; alicyclic tetracarboxylic dianhydrides such as 1,2,3,4-cyclopentanetetracarboxylic dianhydride, 1,2,4,5-cyclohexanetetracarboxylic dianhydride, bicyclo[2.2.2]octa-7-ene-2,3,5,6-tetracarboxylic dianhydride, norbornane-2-spiro-α-cyclopentanone-α'-spiro-2''-norbornane-5,5'',6,6''-tetracarboxylic dianhydride, and dicyclohexyltetracarboxylic dianhydride; and aliphatic tetracarboxylic dianhydrides such as 1,2,3,4-butanetetracarboxylic dianhydride.

The structural unit optionally included in the structural unit A, besides the structural unit (A-1) and the structural unit (A-2), may be one type or two or more types.

The structural unit A preferably does not include structural units other than the structural unit (A-1) and the structural unit (A-2).

Note that, in the present specification, "aromatic tetracarboxylic dianhydride" refers to tetracarboxylic dianhydride including at least one aromatic ring, "alicyclic tetracarboxylic dianhydride" refers to tetracarboxylic dianhydride including at least one alicyclic ring but including no aromatic ring, and "aliphatic tetracarboxylic dianhydride" refers to tetracarboxylic dianhydride including no aromatic ring and no alicyclic ring.

<Structural Unit B>

The structural unit B is a structural unit derived from diamine in the polyimide resin and includes a structural unit (B-1) derived from a compound represented by Formula (b-1) below and a structural unit (B-2) derived from a compound represented by Formula (b-2) below.

The combination of the structural unit (B-1) and the structural unit (B-2) in structural unit B is preferable from the viewpoint of achieving excellent transparency and achieving low residual stress and low retardation properties in a compatible manner.

[Chem. 17]

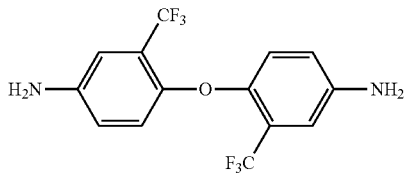

(b-1)

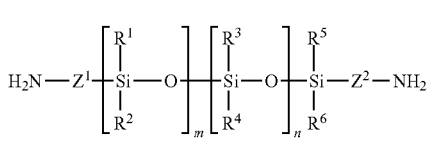

(b-2)

The compound represented by Formula (b-1) is 2,2'-bis(trifluoromethyl)-4,4'-diaminodiphenylether (6FODA).

In Formula (b-2), $Z^1$ and $Z^2$ each independently represent a divalent aliphatic group or a divalent aromatic group, $R^1$ and $R^2$ each independently represent a monovalent aromatic group or a monovalent aliphatic group, $R^3$ and $R^4$ each independently represent a monovalent aliphatic group, $R^5$ and $R^6$ each independently represent a monovalent aliphatic group or a monovalent aromatic group, m and n each independently represent an integer of 1 or greater, and a sum of m and n represents an integer from 2 to 1000. Here, at least one of $R^1$ and $R^2$ represents a monovalent aromatic group.

Note that, two or more different repeating units described in [ ] side by side in Formula (b-2) may be repeated in any form and order of random, alternating, or block, regardless of the arrangement of [ ] in Formula (b-2).

In Formula (b-2), the divalent aliphatic group or divalent aromatic group in $Z^1$ and $Z^2$ may be substituted with a fluorine atom and may contain an oxygen atom. When the divalent aliphatic group or divalent aromatic group includes the oxygen atom as an ether bond, the number of carbon atoms indicated below is the number of all carbon atoms in the aliphatic group or the aromatic group.

Examples of the divalent aliphatic group include divalent saturated or unsaturated aliphatic groups having from 1 to 20 carbon atoms. The number of carbon atoms of the divalent aliphatic group is preferably from 3 to 20.

Examples of the divalent saturated aliphatic group include an alkylene group, an alkyleneoxy group, and a saturated aliphatic group having an ether bond, all having 1 to 20 carbon atoms. Examples of the alkylene group include a methylene group, an ethylene group, a propylene group, a trimethylene group, a tetramethylene group, a hexamethylene group, an octamethylene group, a decamethylene group, and a dodecamethylene group, and examples of the alkyleneoxy group include a propyleneoxy group and a trimethyleneoxy group. Examples of the divalent unsaturated aliphatic group include an alkylene group having from 2 to 20 carbon atoms, and examples of the alkylene group include a vinylene group, a propenylene group, and an alkylene group having an unsaturated double bond at a terminal.

Examples of the divalent aromatic group include an arylene group having from 6 to 20 carbon atoms and an aralkylene group having from 7 to 20 carbon atoms. Specific examples of the arylene group having from 6 to 20 carbon atoms in $Z^1$ and $Z^2$ include an o-phenylene group, a m-phenylene group, a p-phenylene group, a 4,4'-biphenylene group, and a 2,6-naphthylene groups.

As $Z^1$ and $Z^2$, particularly, a trimethylene group and a p-phenylene group are preferable, and a trimethylene group is more preferable.

In Formula (b-2), the monovalent aliphatic group in $R^1$ to $R^6$ include monovalent saturated or unsaturated aliphatic groups. Examples of the monovalent saturated aliphatic group include an alkyl group having 1 to 22 carbon atoms, and examples of such a alkyl group include a methyl group, an ethyl group, and a propyl groups. Examples of the monovalent unsaturated aliphatic group include an alkenyl group having from 2 to 22 carbon atoms, and examples of the alkenyl group include a vinyl group and a propenyl group. These groups may be substituted with a fluorine atom.

Examples of the monovalent aromatic groups in the $R^1$, $R^2$, $R^5$, and $R^6$ of Formula (b-2) include an aryl group having from 6 to 20 carbon atoms, an aryl group having from 7 to 30 carbon atoms and substituted with an alkyl group, and an aralkyl group having from 7 to 30 carbon atoms. As the monovalent aromatic group, an aryl group is preferable, and a phenyl group is more preferable.

At least one of $R^1$ and $R^2$ indicates a monovalent aromatic group, and both $R^1$, and $R^2$ are preferably a monovalent aromatic group and more preferably both $R^1$ and $R^2$ are phenyl groups.

As $R^3$ and $R^4$, an alkyl group having from 1 to 6 carbon atoms is preferable, and a methyl group is more preferable.

As $R^5$ and $R^6$, a monovalent aliphatic group is preferable, and a methyl group is more preferable.

As described above, among the compounds represented by Formula (b-2), a compound represented by Formula (b-21) below is preferable.

[Chem. 18]

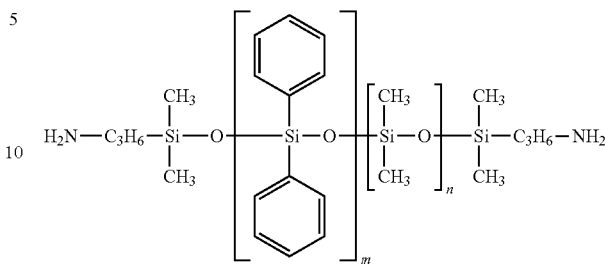

(b-21)

(In Formula (b-21), m and n are the same as those in Formula (b-2).)

In Formulas (b-2) and (b-21), m represents the number of repetitions of siloxane units to which, monovalent, at least one aromatic group is bonded, and n represents the number of repetitions of siloxane units to which the monovalent aliphatic group is bonded.

m and n each independently represent an integer of 1 or greater, and the sum (m+n) of m and n represents an integer from 2 to 1000. The sum of m and n is preferably an integer from 3 to 500, more preferably an integer from 3 to 100, and more preferably from 3 to 50.

The ratio of m/n is preferably from 5/95 to 50/50, more preferably from 10/90 to 40/60, and still more preferably from 20/80 to 30/70.

The functional group equivalent (amine equivalent) of the compound represented by Formula (b-2) and the compound represented by Formula (b-21) is preferably from 150 to 5000 g/mol, more preferably from 400 to 4000 g/mol, and even more preferably from 500 to 3000 g/mol.

Note that "functional group equivalent" refers to the mass of the compound represented by Formula (b-2) per mole of functional group (amino group).

A content of polyorganosiloxane units relative to the total of the structural unit A and the structural unit B is preferably from 5 to 45 mass %, more preferably from 7 to 40 mass %, still more preferably from 10 to 35 mass %, even more preferably from 13 to 35 mass %, even more preferably from 18 to 35 mass %, even more preferably from 25 to 35 mass %, and even more preferably from 28 to 35 mass %. When the content of the polyorganosiloxane unit is within the range described above, the low retardation and the low residual stress can be achieved in a compatible manner.

The polyorganosiloxane unit according to an embodiment of the present invention is identical to the structural unit (B-2), and the content of polyorganosiloxane unit relative to the sum of the structural unit A and the structural unit B is calculated from the mass ratio of the charged amount of the compound providing the structural unit (B-2), preferably the compound represented by the formula (b-2), to the total charged amount of the raw materials providing the structural unit A and the structural unit B.

Commercially available products of the compound represented by Formula (b-2) include "X-22-9409", "X-22-1660B-3", "X-22-161A", and "X-22-161B" available from Shin-Etsu Chemical Co., Ltd.

From the viewpoint of the heat resistance, the proportion of the structural unit (B-1) in the structural unit B is preferably from 85.0 to 99.9 mol %, more preferably from 88.0 to 99.5 mol %, still more preferably from 92.0 to 99.0 mol %, even more preferably from 95.0 to 99.0 mol %, and even more preferably from 97.0 to 99.0 mol %, and the proportion of the structural unit (B-2) in the structural unit B is preferably from 0.01 to 15.0 mol %, more preferably from 0.5 to 12.0 mol %, and still more preferably from 1.0 to 8.0 mol %.

The total content proportion of the structural unit (B-1) and the structural unit (B-2) in the structural unit B is preferably from 35 to 100 mol %, more preferably from 50 to 100 mol %, still more preferably from 75 to 100 mol %, and particularly preferably 100 mol %. The structural unit B may consist only the structural unit (B-1) and the structural unit (B-2).

The structural unit B may include structural units besides the structural unit (B-1) and the structural unit (B-2).

The diamine providing such a structural unit is not particularly limited, and examples thereof include aromatic diamines such as 1,4-phenylenediamine, p-xylylenediamine, 3,5-diaminobenzoic acid, 1,5-diaminonaphthalene, 2,2'-dimethylbiphenyl-4,4'-diamine, 2,2'-bis(trifluoromethyl)benzidine, 2,2'-dimethylbiphenyl-4,4'-diamine, 4,4'-diaminodiphenylether, 4,4'-diaminodiphenylmethane, 1,4-bis[2-(4-aminophenyl)-2-propyl]benzene, 2,2-bis(4-aminophenyl)hexafluoropropane, 4,4'-diaminodiphenylsulfone, 4,4'-diaminobenzanilide, 3,4'-diaminodiphenylether, 1-(4-aminophenyl)-2,3-dihydro-1,3,3-trimethyl-1H-inden-5-amine, α,α'-bis(4-aminophenyl)-1,4-diisopropylbenzene, N,N'-bis(4-aminophenyl)terephthalamide, 4,4'-bis(4-aminophenoxy)biphenyl, 2,2-bis[4-(4-aminophenoxy)phenyl]propane, 2,2-bis(4-(4-aminophenoxy)phenyl)hexafluoropropane, 2,2-bis(3-amino-4-hydroxyphenyl)hexafluoropropane, and 9,9-bis(4-aminophenyl)fluorene and 1,4-bis(4-aminophenoxy)benzene; alicyclic diamines such as 1,3-bis(aminomethyl)cyclohexane and 1,4-bis(aminomethyl)cyclohexane; and aliphatic diamines such as ethylenediamine and hexamethylenediamine.

The structural unit optionally included in the structural unit B, besides the structural unit (B-1) and the structural unit (B-2), may be one type or two or more types.

The structural unit B preferably does not include structural units besides the structural unit (B-1) and the structural unit (B-2). In particular, from the viewpoint of achieving the low retardation, the structural unit B preferably does not contain a structural unit derived from 2,2'-bis(trifluoromethyl) benzidine.

Note that, in the present specification, "aromatic diamine" refers to diamine including at least one aromatic ring, "alicyclic diamine" refers to diamine including at least one alicyclic ring but including no aromatic ring, and "aliphatic diamine" refers to diamine including no aromatic ring and no alicyclic ring.

The polyimide resin according to an embodiment of the present invention may have a structure besides a polyimide chain (structure in which the structural unit A and the structural unit B are imide-bonded). Examples of the structures besides the polyimide chain that can be included in the polyimide resin include structures including an amide bond.

The polyimide resin according to an embodiment of the present invention preferably includes a polyimide chain (structure in which the structural unit A and the structural unit B are imide-bonded) as a main structure. Therefore, the proportion of the polyimide chain in the polyimide resin according to an embodiment of the present invention is preferably 50 mass % or greater, more preferably 70 mass % or greater, even more preferably 90 mass % or greater, and particularly preferably 99 mass % or greater.

By using the polyimide resin according to an embodiment of the present invention, a film having the excellent transparency and the low residual stress and the low retardation can be formed, and suitable physical properties of the film are as follows.

The total light transmittance is preferably 85% or greater, more preferably 87% or greater, and even more preferably 89% or greater when a film having a thickness of 10 μm is used.

When a film having a thickness of 10 μm is formed, the yellow index (YI) is preferably 5.5 or less, more preferably 4.8 or less, and preferably 3.8 or less and more preferably 3.5 or less from the viewpoint of excellent colorless transparency.

The absolute value of a thickness phase difference (Rth) of the polyimide resin according to an embodiment of the present invention, when used as a polyimide film having a thickness of 10 μm, is preferably 200 nm or less, more preferably 150 nm or less, still more preferably 110 nm or less, and particularly preferably 90 nm or less. Note that in the present specification, "low retardation" refers to a case where the thickness phase difference (Rth) is low, and preferably the thickness phase difference (Rth) is within the range described above.

The residual stress is preferably 26 MPa or less, more preferably 20 MPa or less, and still more preferably 15 MPa or less.

Note that the physical properties described above in the present invention can be measured by the method described in examples.

The film that can be formed by using the polyimide resin according to an embodiment of the present invention has suitable physical properties as follows.

The glass transition temperature (Tg) is preferably 200° C. or higher, more preferably 220° C. or higher, and even more preferably 250° C. or higher.

[Method for Producing Polyimide Resin]

The polyimide resin of the present invention can be produced by reacting a tetracarboxylic acid component containing at least one compound selected from the group consisting of a compound providing the structural unit (A-1) above and a compound providing the structural unit (A-2) above with a diamine component containing a compound providing the structural unit (B-1) above and a compound providing the structural unit (B-2) above.

The polyimide resin of the present invention is preferably produced by the imidization (dehydration-ring closure) of a polyamic acid that is a precursor of the polyimide resin. The polyamic acid is a product of a polyaddition reaction of the tetracarboxylic acid component described above and the diamine component described above.

Examples of the compound providing the structural unit (A-1) include, but are not limited to, a compound represented by Formula (a-1), and the compound may be a derivative thereof as long as it provides the same structural unit. Examples of the derivative include tetracarboxylic acid corresponding to the tetracarboxylic dianhydride represented by Formula (a-1) and alkyl esters of the tetracarboxylic acid. The compound represented by Formula (a-1) (that is, dianhydride) is preferable as the compound providing the structural unit (A-1).

Similarly, examples of the compound providing the structural unit (A-2) include, but are not limited to, a compound represented by Formula (a-2), and the compound may be a derivative thereof as long as it provides the same structural unit. Examples of the derivative include tetracarboxylic acid corresponding to the tetracarboxylic dianhydride represented by Formula (a-2) and alkyl esters of the tetracarboxylic acid. The compound represented by Formula (a-2) (that is, dianhydride) is preferable as the compound providing the structural unit (A-2).

The tetracarboxylic acid component contains, in total, a compound providing the structural unit (A-1) and a compound providing the structural unit (A-2) in an amount of preferably 50 mol % or greater, more preferably 70 mol % or greater, still more preferably 90 mol % or greater, and particularly preferably 99 mol % or greater. The upper limit of the total content of the compound providing the structural unit (A-1) and the compound providing the structural unit (A-2) is not particularly limited, that is, 100 mol %. The tetracarboxylic acid component may consist only of a compound providing the structural unit (A-1) and the compound providing the structural unit (A-2).

In a case where the tetracarboxylic acid component includes either the compound providing the structural unit (A-1) or the compound providing the structural unit (A-2), the tetracarboxylic acid component contains the compound providing the structural unit (A-1) or the compound providing the structural unit (A-2) in an amount of preferably 45 mol % or greater, more preferably 70 mol % or greater, and still more preferably 90 mol % or greater in the entire tetracarboxylic acid components. The upper limit of the content of the compound providing the structural unit (A-1) or the compound providing the structural unit (A-2) is not limited, that is, the upper limit is, 100 mol % The tetracarboxylic acid component may consist of either a compound providing the structural unit (A-1) only or the compound providing the structural unit (A-2) only.

In a case where the tetracarboxylic acid component includes both the compound providing the structural unit (A-1) and the compound providing the structural unit (A-2), the tetracarboxylic acid component includes the compound providing the structural unit (A-1) in an amount of preferably 10 to 90 mol % or greater, more preferably 20 to 80 mol % or greater, and still more preferably 40 to 60 mol % or greater in the entire tetracarboxylic acid component. Similarly, the tetracarboxylic acid component includes the compound providing the structural unit (A-2) in an amount of preferably 10 to 90 mol % or greater, more preferably 20 to 80 mol % or greater, and still more preferably 40 to 60 mol % or greater in the entire tetracarboxylic acid components.

The tetracarboxylic acid component may contain a compound providing the structural unit (A-3) in addition to the compound providing the structural unit (A-1) and the compound providing the structural unit (A-2), and the compound providing the structural unit (A-3) is preferable from the viewpoint of improving the heat resistance and achieving the low retardation.

Examples of the compound providing the structural unit (A-3) include, but are not limited to, a compound represented by Formula (a-3), and the compound may be a derivative thereof as long as the compound provides the same structural unit. Examples of the derivative include tetracarboxylic acid corresponding to the tetracarboxylic dianhydride represented by Formula (a-3) and alkyl esters of the tetracarboxylic acid. The compound represented by Formula (a-3) (that is, dianhydride) is preferable as the compound providing the structural unit (A-3).

The tetracarboxylic acid component may contain a compound providing the structural unit (A-4) in addition to the compound providing the structural unit (A-1) and the compound providing the structural unit (A-2), and the compound providing the structural unit (A-4) is preferable from the viewpoint of improving the heat resistance and achieving the low retardation.

Examples of the compound providing the structural unit (A-4) include, but are not limited to, a compound represented by Formula (a-4), and the compound may be a derivative thereof as long as the compound provides the same structural unit. Examples of the derivative include tetracarboxylic acid corresponding to the tetracarboxylic dianhydride represented by Formula (a-4) and alkyl esters of the tetracarboxylic acid. The compound represented by Formula (a-4) (that is, dianhydride) is preferable as the compound providing the structural unit (A-4).

The tetracarboxylic acid component may contain compounds besides the compound providing the structural unit (A-1), the compound providing the constituent (A-2), the compound providing the constituent (A-3), and the compound providing the structural unit (A-4), and examples of the compound include the aromatic tetracarboxylic dianhydride, alicyclic tetracarboxylic dianhydride, and aliphatic tetracarboxylic dianhydride, and derivatives thereof (such as tetracarboxylic acid and alkyl ester of tetracarboxylic acid) described above.

The compound besides the compound providing the structural unit (A-1) and the structural unit (A-2) optionally included in the tetracarboxylic acid component may be one type or two or more types.

Examples of the compound providing the structural unit (B-1) include, but are not limited to, a compound represented by Formula (b-1), and the compound may be a derivative thereof as long as the compound provides the same structural unit. Examples of the derivative include diisocyanate corresponding to the compound represented by Formula (b-1). The compound represented by Formula (b-1) (that is, diamine) is preferable as the compound providing the structural unit (B-1).

Similarly, examples of the compound providing the structural unit (B-2) include, but are not limited to, a compound represented by Formula (b-2), and the compound may be a derivative thereof as long as the compound provides the same structural unit. Examples of the derivative include diisocyanate corresponding to the compound represented by Formula (b-2). The compound represented by Formula (b-2) (that is, diamine) is preferable as the compound providing the structural unit (B-2).

From the viewpoint of the heat resistance of the formed polyimide resin, the diamine component contains the compound providing the structural unit (B-1) in an amount preferably from 85.0 to 99.9 mol %, and more preferably from 88.0 to 99.5 mol %, still more preferably 92.0 to 99.0 mol %, even more preferably 95.0 to 99.0 mol %, and even more preferably 97.0 to 99.0 mol %

Similarly, the diamine component contains the compound providing the structural unit (B-2) in an amount from preferably 0.01 to 15.0 mol %, more preferably from 0.5 to 12.0 mol %, and still more preferably from 1.0 to 8.0 mol %.

The total content proportion of the compound providing the structural unit (B-1) and the compound providing the structural unit (B-2) is preferably 35 mol % or greater, more preferably 50 mol % or greater, and even more preferably 75 mol % or greater, in the entire diamine component. The upper limit of the total content proportion of the compound providing the structural unit (B-1) and the compound providing the structural unit (B-2) is not particularly limited, that is, 100 mol %. The diamine component may consist only of a compound providing the structural unit (B-1) and the compound providing the structural unit (B-2).

The diamine component may contain a compound besides the compound providing the structural unit (B-1) and the compound providing the structural unit (B-2), and examples of the compound include the aromatic diamine described above, alicyclic diamine, and aliphatic diamine, and derivatives thereof (such as diisocyanate).

The compound besides the compound providing the structural unit (B-1) and the compound providing the structural unit (B-2) optionally included in the diamine component may be one type or two or more types.

In an embodiment of the present invention, a ratio of the charged amount of the tetracarboxylic acid component to the charged amount of the diamine component that are used for the production of the polyimide resin is preferably such that the amount of the diamine component is from 0.9 to 1.1 mol per 1 mol of the tetracarboxylic acid component.

Furthermore, in the production of the polyimide resin according to an embodiment of the present invention, an end-capping agent may be used in addition to the tetracarboxylic acid component and the diamine component described above. As the end-capping agent, monoamines or dicarboxylic acids are preferable. A charged amount of the end-capping agent that is introduced is preferably from 0.0001 to 0.1 moles, and particularly preferably from 0.001 to 0.06 moles per 1 mole of the tetracarboxylic acid component. Recommended examples of monoamine end-capping agents include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline, and 4-methylaniline. Of these, benzylamine and aniline can be suitably used. As the dicarboxylic acid end-capping agent, dicarboxylic acids are preferable, and a portion thereof may be subjected to ring closure. Recommended examples thereof include phthalic acid, phthalic anhydride, 4-chlorophthalic acid, tetrafluorophthalic acid, 2,3-benzophenone dicarboxylic acid, 3,4-benzophenone dicarboxylic acid, cyclopentane-1,2-dicarboxylic acid, and 4-cyclohexene-1,2-dicarboxylic acid. Of these, phthalic acid and phthalic anhydride can be suitably used.

A method of reacting the tetracarboxylic acid component and the diamine component described above to form polyamic acid is not particularly limited, and a known method can be used.

Examples of specific reaction methods include (1) a method in which a tetracarboxylic acid component, a diamine component, and a solvent are charged into a reactor and stirred at 0 to 120° C., preferably 5 to 80° C. for 1 to 72 hours, and (2) a method in which the diamine component, preferably the diamine component other than the compound providing the structural unit (B-2) and a solvent are charged into a reactor and the mixture is dissolved, then the tetracarboxylic acid component is charged, and the mixture is stirred in the range of 0 to 120° C., preferably 5 to 80° C. for 1 to 72 hours, and then, as a diamine component, a compound providing preferably a structural unit (B-2) and a solvent are charged, and the mixture is stirred in the range of 0 to 120° C., preferably 15 to 80° C. for 0.5 to 10 hours. Among these, the production method of (2) is preferable.

When carrying out the reaction at 80° C. or lower, the molecular weight of the formed polyamic acid does not vary depending on a temperature history during polymerization, and the progress of thermal imidization can also be suppressed, so that the polyamic acid can be stably produced.

The solvent used for producing the polyamic acid may be any solvent that can dissolve the polyamic acid to be produced. Examples thereof include aprotic solvents, phenol-based solvents, ether-based solvents, carbonate-based solvents, and the like.

Specific examples of the aprotic solvent include amide-based solvents, such as N,N-dimethylformamide, N,N-dimethylacetamide, N-methyl-2-pyrrolidone, N-methylcaprolactam, 1,3-dimethylimidazolidinone, and tetramethylurea; lactone-based solvents, such as γ-butyrolactone and γ-valerolactone; phosphorus-containing amide-based solvents, such as hexamethylphosphoric amide and hexamethylphosphine triamide; sulfur-containing solvents, such as dimethyl sulfone, dimethyl sulfoxide, and sulfolane; ketone-based solvents, such as acetone, methyl ethyl ketone, cyclohexanone, and methylcyclohexanone; and ester-based solvents, such as (2-methoxy-1-methylethyl)acetate.

Specific examples of the phenol-based solvent include phenol, o-cresol, m-cresol, p-cresol, 2,3-xylenol, 2,4-xylenol, 2,5-xylenol, 2,6-xylenol, 3,4-xylenol, and 3,5-xylenol.

Specific examples of the ether-based solvent include 1,2-dimethoxyethane, bis(2-methoxyethyl)ether, 1,2-bis(2-methoxyethoxy)ethane, bis[2-(2-methoxyethoxy)ethyl]ether, tetrahydrofuran, and 1,4-dioxane.

Specific examples of the carbonate-based solvent include diethyl carbonate, methylethyl carbonate, ethylene carbonate, and propylene carbonate.

Among the above reaction solvents, an amide-based solvent or a lactone-based solvent is preferable, an amide-based solvent is more preferable, and N-methyl-2-pyrrolidone is still more preferable. Furthermore, the reaction solvent may be used alone, or a mixture of two or more types of the reaction solvents may be used.

According to the method described above, a polyamic acid solution containing polyamic acid dissolved in a solvent is produced.

The concentration of the polyamic acid in the produced polyamic acid solution is generally from 1 to 50 mass % in the polyamic acid solution, preferably from 3 to 35 mass %, and more preferably from 10 to 30 mass %.

A number average molecular weight of the polyamic acid according to an embodiment of the present invention is preferably from 5000 to 200000 from the viewpoint of mechanical strength of the polyimide film that is produced. Note that the number average molecular weight of the polyamic acid can be determined, for example, by gel permeation chromatography analysis based on calibration with standard polymethylmethacrylate (PMMA).

[Polyamic Acid Varnish]

A varnish according to an embodiment of the present invention is produced by dissolving polyamic acid, which is a precursor of the polyimide resin according to an embodiment of the present invention, in an organic solvent. That is, the varnish according to an embodiment of the present invention contains an organic solvent and polyamic acid which is the precursor of the polyimide resin according to an embodiment of the present invention, and the polyamic acid is dissolved in the organic solvent.

The organic solvent is not particularly limited as long as the organic solvent dissolves the polyamic acid, and one type or a mixture of two or more types of the compounds described above as the solvents used during the production of the polyamic acid is preferably used.

The varnish according to an embodiment of the present invention may be the polyamic acid solution itself described above, or it may be a solution in which a diluting solvent is further added to the polyamic acid solution.

The varnish according to an embodiment of the present invention can further contain an imidization catalyst and a dehydration catalyst from the viewpoint of efficiently advancing imidization. The imidization catalyst may have a boiling point of from 40° C. to 180° C., and is preferably an amine compound having a boiling point of 180° C. or lower. The imidization catalyst with the boiling point of 180° C. or lower is unlikely to cause coloration of the film during drying at a high temperature after the formation of the film, and thus such a catalyst does not impair the appearance of the film. In addition, in a case of an imidization catalyst having a boiling point of 40° C. or higher, it is possible to avoid the possibility of volatilization of the imidization catalyst before sufficient imidization progresses.

Examples of the amine compound preferably used as the imidization catalyst include pyridine and picoline. The imidization catalyst may be used alone, or a combination of two or more types of the imidization catalysts may be used.

Examples of the dehydration catalyst include acid anhydrides such as acetic anhydride, propionic anhydride, n-butyric anhydride, benzoic anhydride, and trifluoroacetic anhydride; and carbodiimide compounds such as dicyclohexylcarbodiimide. One of these compounds may be used alone, or two or more may be used in combination.

Since the polyamic acid in the varnish according to an embodiment of the present invention has solvent solubility, the vanish can be made a highly concentrated varnish that is stable at room temperature. The varnish according to an embodiment of the present invention contains preferably from 5 to 40 mass %, and more preferably from 10 to 30 mass %, of the polyamic acid. A viscosity of the varnish is preferably from 0.1 to 100 Pa·s and more preferably from 0.1 to 20 Pa·s. The viscosity of the varnish is a value measured at 25° C. using an E-type viscometer.

Furthermore, the varnish according to an embodiment of the present invention may contain various additives, such as inorganic fillers, adhesion promoters, release agents, flame retardants, ultraviolet stabilizers, surfactants, leveling agents, defoaming agents, fluorescent brightening agents, crosslinking agents, polymerization initiators, and photosensitizers, in the range that does not impair required characteristics of a polyimide film.

The method of producing the varnish according to an embodiment of the present invention is not particularly limited, and a known method can be employed.

[Polyimide Resin/Polyimide Film]

A polyimide film according to an embodiment of the present invention contains the polyimide resin according to an embodiment of the present invention. Therefore, the polyimide film according to an embodiment of the present invention exhibits the excellent transparency and the lower retardation and low residual stress. Suitable physical properties of the polyimide film according to an embodiment of the present invention are as described above.

The polyimide film according to an embodiment of the present invention can be produced using a varnish formed by dissolving the polyamic acid described above in the organic solvent.

The method of producing the polyimide film using the varnish according to an embodiment of the present invention is not particularly limited, and a known method can be employed. For example, after the varnish according to an embodiment of the present invention is applied to, or formed into a film-form on a smooth support such as a glass plate, a metal plate, or plastic, an organic solvent such as a reaction solvent or a diluting solvent present in the varnish is removed by heating, thus a polyamic acid film is produced. The polyamic acid in the polyamic acid film is imidized (dehydration-ring closure) by heating, and then the polyimide film can be produced by peeling off from the support.

The heating temperature, at which the polyamic acid varnish is dried and the polyamic acid film is formed, is preferably 50 to 150° C. The heating temperature, at which the polyamic acid is imidized by heating can be selected from the range from preferably 200 to 500° C., more preferably from 250 to 450° C., and still more preferably from 300 to 400° C. In addition, the heating time is generally from 1 minute to 6 hours, preferably from 5 minutes to 2 hours, and more preferably from 15 minutes to 1 hour.

The heating atmosphere includes air, nitrogen gas, oxygen gas, hydrogen gas, nitrogen/hydrogen mixed gas, and the like, and in order to suppress the coloration of the formed polyimide resin, the nitrogen gas with an oxygen concentration of 100 ppm or less and nitrogen/hydrogen mixed gas containing hydrogen at a concentration of 0.5% or less.

Note that the imidization method is not limited to the thermal imidization, and the chemical imidization can also be applied.

The thickness of the polyimide film according to an embodiment of the present invention can be appropriately selected depending on the purpose of use thereof but is preferably from 1 to 250 µm, more preferably from 5 to 100 µm, and still more preferably from 7 to 50 µm. When the thickness is from 1 to 250 µm, practical use as a self-supporting film becomes possible.

The thickness of the polyimide film can be easily controlled by adjusting the solid content concentration and viscosity of the polyimide varnish.

The polyimide film according to an embodiment of the present invention is suitably used as films for various components, such as color filters, flexible displays, semiconductor components, and optical members. The polyimide film according to an embodiment of the present invention is particularly preferably used as a substrate for an image display device such as a liquid crystal display and an OLED display.

EXAMPLES

The present invention is described more specifically below through examples. However, the present invention is not limited in any way by these examples.

The physical properties of the films produced in examples and comparative examples were measured by the methods described below.

(1) Film Thickness

The film thickness was measured by using a micrometer, available from Mitutoyo Corporation.

(2) Total Light Transmittance, Yellow Index (YI)

The total light transmittance and YI were measured by using the color and turbidity measuring instrument "COH 400", available from Nippon Denshoku Industries Co., Ltd., in accordance with JIS K 7105:1981.

(3) Glass Transition Temperature (Tg)

Using a thermomechanical analyzer "TMA/SS6100" available from Hitachi High-Tech Science Corporation, the temperature was raised to a temperature sufficient to remove the residual stress, and then cooled to room temperature, where the conditions are: sample size of 3 mm×20 mm, a load of 0.1 N, nitrogen gas flow (flow rate of 200 mL/min), and heating rate of 10° C./min, and a measurement in a tensile mode. Then, the elongation of the test piece was measured under the same conditions as the treatment for removing the residual stress, and a temperature, at which the inflection point of the elongation was observed, was defined as the glass transition temperature.

(4) Thickness Phase Difference (Rth)

The thickness phase difference (Rth) was measured by using an ellipsometer (M-220), available from JASCO Corporation. The value of the thickness phase difference at a measurement wavelength of 590 nm was measured. When the maximum refractive index in the plane of the polyimide film is designated as nx, the minimum refractive index in the plane of the polyimide film is designated as ny, the refractive index in the thickness direction is designated as nz, and the thickness of the film is designated as d, the Rth is represented by the following expression:

$$Rth=[\{(nx+ny)/2\}-nz] \times d$$

(5) Residual Stress

For a 4-inch silicon wafer having a thickness of 525 μm±25 μm, the "warp amount" was measured in advance, by using a residual stress measuring device "FLX-2320" available from KLA-Tencor Corporation. The polyamic acid varnish was applied on the 4-inch silicon water and prebaked. Thereafter, a heat curing treatment was performed at 350° C. for 30 minutes (heating rate: 5° C./minute) in a nitrogen atmosphere by using a hot air dryer so as to produce a silicon wafer with a polyimide film having a film thickness from 6 to 20 μm after curing. The warp amount of the wafer was measured using the residual stress measurement device described above, and residual stress developed between the silicon wafer and the polyimide film was evaluated.

The tetracarboxylic acid component and diamine component used in the examples and comparative examples, and the abbreviations thereof are as follows.

<Tetracarboxylic Acid Component> s-BPDA: 3,3',4,4'-biphenyltetracarboxylic dianhydride (a compound represented by Formula (a-1-1s), available from Mitsubishi Chemical Corporation.)

a-BPDA: 2,3,3',4'-biphenyltetracarboxylic dianhydride (a compound represented by Formula (a-1-1a))

TMPBP-TME: a compound represented by Formula (a-2-2), available from Honshu Chemical Industry Co., Ltd.

TAHQ: p-phenylenebis(trimeritate)dianhydride (a compound represented by Formula (a-2-1), available from MANAC Incorporated)

s-ODPA: 4,4'-oxydiphthalic anhydride (a compound represented by Formula (a-1-2s), available from MANAC Incorporated)

CBDA: 1,2,3,4-cyclobutanetetracarboxylic dianhydride (a compound represented by Formula (a-3))

BPAF: 9,9'-bis(3,4-dicarboxyphenyl)fluorene dianhydride (available from JFE Chemical Corporation; a compound represented by Formula (a-4))

<Diamine Component>

6FODA: 2,2'-bis(trifluoromethyl)-4,4'-diaminodiphenylether (available from ChinaTech (Tianjin) Chemical Co., Ltd.; a compound represented by Formula (b-1))

X-22-1660B-3: Amino-modified dual end type silicone oil (available from Shin-Etsu Chemical Co., Ltd., a compound represented by Formula (b-2) (functional group equivalent weight: 2200 g/mol or 2170 g/mol))

TFMB: 2,2'-bis(trifluoromethyl)benzidine (available from Seika Corporation.)

Abbreviations for solvents and the like used in the examples and comparative examples are as follows.

NMP: N-methyl-2-pyrrolidone (available from Mitsubishi Chemical Corporation.)

Example 1

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.227 g (0.0780 mol) of 6FODA, and 109.317 g of NMP, the mixture was stirred at a rotational speed of 200 rpm in a nitrogen atmosphere with a system internal temperature of 50° C., and a solution was obtained.

To this solution, 23.536 g (0.0800 mol) of s-BPDA and 27.329 g of NMP were charged together and the mixture was stirred for 7 hours while held at 50° C. with a mantle heater.

Thereafter, 83.66 g of NMP was added and the mixture was homogenized, and 8.800 g (0.0020 mol) of X-22-1660B-3 (functional group equivalent weight of 2200 g/mol) dissolved in 13.940 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

Next, the formed polyamic acid varnish was coated on a silicon wafer on the glass plate using a spin coater, then held for 20 minutes at 80° C. using a hot plate, after which heated in a hot air drier at a temperature of 350° C. for 30 minutes (temperature increase rate: 5° C./minute) in a nitrogen atmosphere and the solvent was evaporated off. And thus, the varnish was further imidized thermally a polyimide film was produced. The results are shown in Table 1.

Example 2

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 16.069 g (0.0478 mol) of 6FODA, and 90.744 g of NMP, the mixture was stirred at a rotational speed of 200 rpm in a nitrogen atmosphere with a system internal temperature of 50° C., and a solution was obtained.

To this solution, 7.355 g (0.0250 mol) of s-BPDA, 15.465 g (0.0250 mol) of TMPBP-TME, and 22.686 g of NMP were charged together, and the mixture was stirred for 7 hours while held at 50° C. using a mantle heater.

Thereafter, 69.447 g of NMP was added and the mixture was homogenized, and 9.724 g (0.0022 mol) of X-22-1660B-3 (functional group equivalent weight of 2200 g/mol) dissolved in 11.574 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 1.

Example 3

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 9.550 g (0.0284 mol) of 6FODA, and 65.600 g of NMP, the mixture was stirred at a rotational speed of 200 rpm in a nitrogen atmosphere with a system internal temperature of 50° C., and a solution was obtained.

To this solution, 18.558 g (0.0300 mol) of TMPBP-TME and 16.400 g of NMP were charged together and the mixture was stirred for 7 hours while held at 50° C. with a mantle heater.

Thereafter, 50.204 g of NMP was added and the mixture was homogenized, and 7.036 g (0.0016 mol) of X-22-1660B-3 (functional group equivalent weight of 2200 g/mol)

dissolved in 8.367 g of NMP was added. Thereafter, the temperature was raised to 80° C. and the mixture was stirred for 1 hour, then the temperature was brought back to room temperature, and a polyamic acid varnish with a solid content concentration of 20 mass % was obtained.

The formed polyamic acid varnish was then used to prepare a film by the same method as that of Example 1 to produce a polyimide film. The results are shown in Table 1.

Example 4

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.952 g (0.0772 mol) of 6FODA, and 115.507 g of NMP, the mixture was stirred at a rotational speed of 200 rpm in a nitrogen atmosphere with a system internal temperature of 50° C., and a solution was obtained.

To this solution, 23.536 g (0.0800 mol) of s-BPDA and 28.877 g of NMP were charged together and the mixture was stirred for 7 hours while held at 50° C. with a mantle heater.

Thereafter, 88.398 g of NMP was added and the mixture was homogenized, and 12.390 g (0.0028 mol) of X-22-1660B-3 (functional group equivalent weight of 2200 g/mol) dissolved in 14.733 g of NMP was added. Thereafter, the temperature was raised to 80° C. and the mixture was stirred for 1 hour, then the temperature was brought back to room temperature, and a polyamic acid varnish with a solid content concentration of 20 mass % was obtained.

The formed polyamic acid varnish was then used to prepare a film by the same method as that of Example 1 to produce a polyimide film. The results are shown in Table 1.

Example 5

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.502 g (0.0788 mol) of 6FODA, and 128.368 g of NMP, the mixture was stirred at a rotational speed of 200 rpm in a nitrogen atmosphere with a system internal temperature of 50° C., and a solution was obtained.

To this solution, 24.386 g (0.0829 mol) of s-BPDA and 32.092 g of NMP were charged together and the mixture was stirred for 7 hours while held at 50° C. with a mantle heater.

Thereafter, 98.241 g of NMP was added and the mixture was homogenized, and 17.881 g (0.0041 mol) of X-22-1660B-3 (functional group equivalent weight of 2200 g/mol) dissolved in 16.373 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 1.

Example 6

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 27.311 g (0.0812 mol) of 6FODA, and 130.538 g of NMP, the mixture was stirred at a rotational speed of 200 rpm in a nitrogen atmosphere with a system internal temperature of 50° C., and a solution was obtained.

To this solution, 24.386 g (0.0829 mol) of s-BPDA and 32.635 g of NMP were charged together and the mixture was stirred for 7 hours while held at 50° C. with a mantle heater.

Thereafter, 99.902 g of NMP was added and the mixture was homogenized, and 18.234 g (0.0041 mol) of X-22-1660B-3 (functional group equivalent weight of 2200 g/mol) dissolved in 16.650 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 1.

Example 7

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 25.299 g (0.0752 mol) of 6FODA, and 130.254 g of NMP, the mixture was stirred at a rotational speed of 200 rpm in a nitrogen atmosphere with a system internal temperature of 50° C., and a solution was obtained.

In this solution, 23.536 g (0.0800 mol) of s-BPDA and 32.563 g of NMP were charged together and the mixture was stirred for 7 hours while held at 50° C. with a mantle heater.

Thereafter, 99.684 g of NMP was added and the mixture was homogenized, and 20.944 g (0.0048 mol) of X-22-1660B-3 (functional group equivalent weight of 2200 g/mol) dissolved in 16.614 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 8

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 16.276 g (0.0484 mol) of 6FODA, and 86.080 g of NMP, the mixture was stirred at a rotational speed of 200 rpm in a nitrogen atmosphere with a system internal temperature of 50° C., and a solution was obtained.

To this solution, 22.917 g (0.0500 mol) of TAHQ and 21.520 g of NMP were charged together and the mixture was stirred for 7 hours while held at 50° C. with a mantle heater.

Thereafter, 65.878 g of NMP was added and the mixture was homogenized, and 6.922 g (0.0016 mol) of X-22-1660B-3 (functional group equivalent weight of 2170 g/mol) dissolved in 10.980 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 9

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 16.057 g (0.0478 mol) of 6FODA, and 90.938 g of NMP, the mixture was stirred at a rotational speed of 200 rpm in a nitrogen atmosphere with a system internal temperature of 50° C., and a solution was obtained.

To this solution, 22.917 g (0.0500 mol) of TAHQ and 22.735 g of NMP were charged together and the mixture was stirred for 7 hours while held at 50° C. with a mantle heater.

Thereafter, 69.596 g of NMP was added and the mixture was homogenized, and 9.743 g (0.0022 mol) of X-22-1660B-3 (functional group equivalent weight of 2170 g/mol) dissolved in 11.599 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 10

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 28.477 g (0.0847 mol) of 6FODA, and 111.585 g of NMP, the mixture was stirred at a rotational speed of 200 rpm in a nitrogen atmosphere with a system internal temperature of 50° C., and a solution was obtained.

To this solution, 25.324 g (0.0861 mol) of s-BPDA and 27.896 g of NMP were charged together and the mixture was stirred for 7 hours while held at 50° C. with a mantle heater.

Thereafter, 85.397 g of NMP was added and the mixture was homogenized, and 5.977 g (0.0014 mol) of X-22-1660B-3 (functional group equivalent weight of 2170 g/mol) dissolved in 14.233 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 11

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 27.511 g (0.0818 mol) of 6FODA, and 117.638 g of NMP, the mixture was stirred at a rotational speed of 200 rpm in a nitrogen atmosphere with a system internal temperature of 50° C., and a solution was obtained.

To this solution, 26.057 g (0.0840 mol) of s-ODPA and 29.410 g of NMP were charged together and the mixture was stirred for 7 hours while held at 50° C. with a mantle heater.

Thereafter, 90.029 g of NMP was added and the mixture was homogenized, and 9.453 g (0.0022 mol) of X-22-1660B-3 (functional group equivalent weight of 2170 g/mol) dissolved in 15.005 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 12

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.407 g (0.0785 mol) of 6FODA, and 111.487 g of NMP, the mixture was stirred at a rotational speed of 200 rpm in a nitrogen atmosphere with a system internal temperature of 50° C., and a solution was obtained.

To this solution, 12.502 g (0.0403 mol) of s-ODPA, 11.857 g (0.0403 mol) of s-BPDA, and 27.872 g of NMP were charged together, and the mixture was stirred for 7 hours while held at 50° C. using a mantle heater.

Thereafter, 85.322 g of NMP was added and the mixture was homogenized, and 8.959 g (0.0021 mol) of X-22-1660B-3 (functional group equivalent weight of 2170 g/mol) dissolved in 14.220 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 2.

Example 13

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.124 g (0.0777 mol) of 6FODA, and 111.794 g of NMP, the mixture was stirred at a rotational speed of 200 rpm in a nitrogen atmosphere with a system internal temperature of 50° C., and a solution was obtained.

To this solution, 12.502 g (0.0403 mol) of s-ODPA, 11.857 g (0.0403 mol) of s-BPDA, and 29.449 g of NMP were charged together, and the mixture was stirred for 7 hours while held at 50° C. using a mantle heater.

Thereafter, 184.053 g of NMP was added and the mixture was homogenized, and 12.621 g (0.0029 mol) of X-22-1660B-3 (functional group equivalent weight of 2170 g/mol) dissolved in 26.29 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 14

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.116 g (0.0777 mol) of 6FODA, and 118.678 g of NMP, the mixture was stirred at a rotational speed of 200 rpm in a nitrogen atmosphere with a system internal temperature of 50° C., and a solution was obtained.

To this solution, 20.003 g (0.0645 mol) of s-ODPA, 4.743 g (0.0161 mol) of s-BPDA, and 29.670 g of NMP were charged together, and the mixture was stirred for 7 hours while held at 50° C. using a mantle heater.

Thereafter, 185.435 g of NMP was added and the mixture was homogenized, and 12.716 g (0.0029 mol) of X-22-1660B-3 (functional group equivalent weight of 2170 g/mol) dissolved in 26.490 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 15

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.119 g (0.0777 mol) of 6FODA, and 118.390 g of NMP, the mixture was stirred at a rotational speed of 200 rpm in a nitrogen atmosphere with a system internal temperature of 50° C., and a solution was obtained.

To this solution, 17.502 g (0.0564 mol) of s-ODPA, 7.114 g (0.0242 mol) of s-BPDA, and 29.597 g of NMP were charged together, and the mixture was stirred for 7 hours while held at 50° C. using a mantle heater.

Thereafter, 184.984 g of NMP was added and the mixture was homogenized, and 12.688 g (0.0029 mol) of X-22-1660B-3 (functional group equivalent weight of 2170 g/mol) dissolved in 26.430 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 16

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.112 g (0.0777 mol) of 6FODA, and 119.262 g of NMP, the mixture was stirred at a rotational speed of 200 rpm in a nitrogen atmosphere with a system internal temperature of 50° C., and a solution was obtained.

To this solution, 25.003 g (0.0806 mol) of s-ODPA and 29.816 g of NMP were charged together and the mixture was stirred for 7 hours while held at 50° C. with a mantle heater.

Thereafter, 186.347 g of NMP was added and the mixture was homogenized, and 12.775 g (0.0029 mol) of X-22-1660B-3 (functional group equivalent weight of 2170 g/mol) dissolved in 26.621 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 17

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.199 g (0.0779 mol) of 6FODA, and 108.739 g of NMP, the mixture was stirred at a rotational speed of 200 rpm in a nitrogen atmosphere with a system internal temperature of 50° C., and a solution was obtained.

To this solution, 12.502 g (0.0403 mol) of s-ODPA, 7.903 g (0.0403 mol) of CBDA, and 27.185 g of NMP were charged together, and the mixture was stirred for 7 hours while held at 50° C. using a mantle heater.

Thereafter, 169.904 g of NMP was added and the mixture was homogenized, and 11.649 g (0.0027 mol) of X-22-1660B-3 (functional group equivalent weight of 2170 g/mol) dissolved in 24.273 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 18

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 25.998 g (0.0773 mol) of 6FODA, and 132.942 g of NMP, the mixture was stirred at a rotational speed of 200 rpm in a nitrogen atmosphere with a system internal temperature of 50° C., and a solution was obtained.

To this solution, 12.502 g (0.0403 mol) of s-ODPA, 18.475 g (0.0403 mol) of BPAF, and 33.236 g of NMP were charged together, and the mixture was stirred for 7 hours while held at 50° C. using a mantle heater.

Thereafter, 207.723 g of NMP was added and the mixture was homogenized, and 14.244 g (0.0033 mol) of X-22-1660B-3 (functional group equivalent weight of 2170 g/mol) dissolved in 29.674 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 19

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.010 g (0.0774 mol) of 6FODA, and 131.468 g of NMP, the mixture was stirred at a rotational speed of 200 rpm in a nitrogen atmosphere with a system internal temperature of 50° C., and a solution was obtained.

To this solution, 18.475 g (0.0403 mol) of BPAF, 11.857 g (0.0403 mol) of s-BPDA, and 32.867 g of NMP were charged together, and the mixture was stirred for 7 hours while held at 50° C. using a mantle heater.

Thereafter, 205.419 g of NMP was added and the mixture was homogenized, and 14.087 g (0.0032 mol) of X-22-1660B-3 (functional group equivalent weight of 2170 g/mol) dissolved in 29.346 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Example 20

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.136 g (0.0777 mol) of 6FODA, and 116.314 g of NMP, the mixture was stirred at a rotational speed of 200 rpm in a nitrogen atmosphere with a system internal temperature of 50° C., and a solution was obtained.

To this solution, 11.857 g (0.0403 mol) of a-BPDA, 11.857 g (0.0403 mol) of s-BPDA, and 29.079 g of NMP were charged together, and the mixture was stirred for 7 hours while held at 50° C. using a mantle heater.

Thereafter, 181.741 g of NMP was added and the mixture was homogenized, and 12.460 g (0.0029 mol) of X-22-1660B-3 (functional group equivalent weight of 2170 g/mol) dissolved in 25.963 g of NMP was added. Thereafter, the temperature was held at 50° C. and the mixture was stirred for 1 hour, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 3.

Comparative Example 1

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 26.899 g (0.0800 mol) of 6FODA, and 94.146 g of NMP, the mixture was stirred at a rotational speed of 200 rpm in a nitrogen atmosphere with a system internal temperature of 50° C., and a solution was obtained.

To this solution, 23.536 g (0.0800 mol) of s-BPDA and 23.536 g of NMP were charged together and the mixture was stirred for 5 hours while held at 50° C. with a mantle heater.

Thereafter, 84.059 g of NMP was added and the mixture was homogenized, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 4.

Comparative Example 2

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 16.812 g (0.0500 mol) of 6FODA, and 73.979 g of NMP, the mixture was stirred at a rotational speed of 200 rpm in a nitrogen atmosphere with a system internal temperature of 50° C., and a solution was obtained.

To this solution, 7.355 g (0.0250 mol) of s-BPDA, 15.465 g (0.0250 mol) of TMPBP-TME, and 18.495 g of NMP were charged together, and the mixture was stirred for 5 hours while held at 50° C. using a mantle heater.

Thereafter, 66.053 g of NMP was added and the mixture was homogenized, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 4.

Comparative Example 3

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 13.450 g (0.0400 mol) of 6FODA, and 101.705 g of NMP, the mixture was stirred at a rotational speed of 200 rpm in a nitrogen atmosphere with a system internal temperature of 50° C., and a solution was obtained.

To this solution, 18.333 g (0.0400 mol) of TAHQ and 25.426 g of NMP were charged together and the mixture was stirred for 5 hours while held at 50° C. with a mantle heater.

Thereafter, 52.971 g of NMP was added and the mixture was homogenized, then the temperature was brought back to room temperature, and a polyamic acid varnish with a solid content concentration of 15 mass % was formed.

The formed polyamic acid varnish was then used to prepare a film by the same method as that of Example 1 to produce a polyimide film. The results are shown in Table 4.

Comparative Example 4

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 27.831 g (0.0869 mol) of TFMB, and 111.596 g of NMP, the mixture was stirred at a rotational speed of 200 rpm in a nitrogen atmosphere with a system internal temperature of 50° C., and a solution was obtained.

To this solution, 25.975 g (0.0883 mol) of s-BPDA and 27.899 g of NMP were charged together and the mixture was stirred for 7 hours while held at 50° C. with a mantle heater.

Thereafter, 85.405 g of NMP was added and the mixture was homogenized, and 5.977 g (0.0014 mol) of X-22-1660B-3 (functional group equivalent weight of 2170 g/mol) dissolved in 14.234 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 4.

Comparative Example 5

A 500 mL five-neck round-bottom flask provided with a semilunar-shaped stirring blade made of stainless steel, a nitrogen introduction tube, a Dean-Stark apparatus equipped with a condenser, a thermometer, and an end cap made of glass was charged with 21.814 g (0.0681 mol) of TFMB, and 111.305 g of NMP, the mixture was stirred at a rotational speed of 200 rpm in a nitrogen atmosphere with a system internal temperature of 50° C., and a solution was obtained.

In this solution, 31.851 g (0.0695 mol) of TAHQ and 27.826 g of NMP were charged together and the mixture was stirred for 7 hours while held at 50° C. with a mantle heater.

Thereafter, 85.183 g of NMP was added and the mixture was homogenized, and 5.963 g (0.0014 mol) of X-22-1660B-3 (functional group equivalent weight of 2170 g/mol) dissolved in 14.197 g of NMP was added. Thereafter, the temperature was raised to 80° C. and the mixture was stirred for 1 hour, then the temperature was brought back to room temperature, and a polyamic acid varnish with a solid content concentration of 20 mass % was formed.

The formed polyamic acid varnish was then used to prepare a film by the same method as that of Example 1 to produce a polyimide film. The results are shown in Table 4.

TABLE 1

|  |  |  | Example 1 | Example 2 | Example 3 | Example 4 | Example 5 | Example 6 |
|---|---|---|---|---|---|---|---|---|
| Polyamic acid/polyimide composition | Tetracarboxylic acid component [mol %] | s-BPDA (a-1-1s) | 100 | 50 | — | 100 | 100 | 100 |
|  |  | a-BPDA (a-1-1a) | — | — | — | — | — | — |
|  |  | s-ODPA (a-1-2s) | — | — | — | — | — | — |
|  |  | TAHQ (a-2-1) | — | — | — | — | — | — |
|  |  | TMPBP-TME (a-2-2) | — | 50 | 100 | — | — | — |
|  |  | CBDA (a-3) | — | — | — | — | — | — |
|  |  | BPAF (a-4) | — | — | — | — | — | — |
|  | Diamine Component [mol %] | 6FODA (b-1) | 97.5 | 95.6 | 94.7 | 96.5 | 95.1 | 98 * |
|  |  | X-22-1660B-3 (b-2) | 2.5 | 4.4 | 5.3 | 3.5 | 4.9 | 5 * |
|  |  | TFMB | — | — | — | — | — | — |
|  | Polyorganosiloxane unit content [mass %] |  | 15 | 20 | 20 | 20 | 26 | 26 |
| Film evaluation | Film thickness [μm] |  | 10 | 10 | 9 | 8.5 | 10 | 10 |
|  | Total light transmittance [%] |  | 90.14 | 91.3 | 91.4 | 90.4 | 90.54 | 90.3 |
|  | YI |  | 4.5 | 2.35 | 1.98 | 3.77 | 4.69 | 5.2 |
|  | Tg (° C.) |  | 285 | 273 | 274 | 277 | 260 | 267 |
|  | Rth [nm] |  | 58.6 | 88.4 | 92.9 | 63.9 | 33 | 32.8 |
|  | Rth (10 um converted) [nm] |  | 58.6 | 88.4 | 103.2 | 75.2 | 33 | 32.8 |
|  | Residual stress [MPa] |  | 20.3 | 17.1 | 23.7 | 17.4 | 15.11 | 17 |

* The diamine component of Example 6 indicates the molar amount with respect to 100 mol parts of the tetracarboxylic acid component.

TABLE 2

|  |  |  | Example 7 | Example 8 | Example 9 | Example 10 | Example 11 | Example 12 |
|---|---|---|---|---|---|---|---|---|
| Polyamic acid/polyimide composition | Tetracarboxylic acid component [mol %] | s-BPDA (a-1-1s) | 100 | — | — | 100 | — | 50 |
|  |  | a-BPDA (a-1-1a) | — | — | — | — | — | — |
|  |  | s-ODPA (a-1-2s) | — | — | — | — | 100 | 50 |
|  |  | TAHQ (a-2-1) | — | 100 | 100 | — | — | — |
|  |  | TMPBP-TME (a-2-2) | — | — | — | — | — | — |
|  |  | CBDA (a-3) | — | — | — | — | — | — |
|  |  | BPAF (a-4) | — | — | — | — | — | — |
|  | Diamine Component [mol %] | 6FODA (b-1) | 94.1 | 96.8 | 95.5 | 98.4 | 97.4 | 97.4 |
|  |  | X-22-1660B-3 (b-2) | 5.9 | 3.2 | 4.5 | 1.6 | 2.6 | 2.6 |
|  |  | TFMB | — | — | — | — | — | — |
|  | Polyorganosiloxane unit content [mass %] |  | 30 | 15 | 20 | 10 | 15 | 15 |
| Film evaluation | Film thickness [μm] |  | 10 | 10 | 10 | 6.5 | 6.5 | 6.5 |
|  | Total light transmittance [%] |  | 90.8 | 89.85 | 89.95 | 90.03 | 90.48 | 90.35 |
|  | YI |  | 4.69 | 3.5 | 3.24 | 3.42 | 1.83 | 2.37 |
|  | Tg (° C.) |  | 252 | 228 | 225 | 286 | 239 | 260 |
|  | Rth [nm] |  | 19.7 | 115.9 | 104.4 | 44.3 | 41.3 | 38.6 |
|  | Rth (10 um converted) [nm] |  | 19.7 | 115.9 | 104.4 | 68.0 | 63.5 | 59.4 |
|  | Residual stress [MPa] |  | 7.4 | 14.4 | 14.8 | 25.6 | 17.3 | 17 |

TABLE 3

|  |  |  | Example 13 | Example 14 | Example 15 | Example 16 | Example 17 | Example 18 | Example 19 | Example 20 |
|---|---|---|---|---|---|---|---|---|---|---|
| Polyamic acid/polyimide composition | Tetracarboxylic acid component [mol %] | s-BPDA (a-1-1s) | 50 | 20 | 30 | — | — | — | 50 | 50 |
|  |  | a-BPDA (a-1-1a) | — | — | — | — | — | — | — | 50 |
|  |  | s-ODPA (a-1-2s) | 50 | 80 | 70 | 100 | 50 | 50 | — | — |
|  |  | TAHQ (a-2-1) | — | — | — | — | — | — | — | — |
|  |  | TMPBP-TME (a-2-2) | — | — | — | — | — | — | — | — |
|  |  | CBDA (a-3) | — | — | — | — | 50 | — | — | — |
|  |  | BPAF (a-4) | — | — | — | — | — | 50 | 50 | — |
|  | Diamine Component [mol %] | 6FODA (b-1) | 96.4 | 96.4 | 96.4 | 96.4 | 96.7 | 95.9 | 96.0 | 96.4 |
|  |  | X-22-1660B-3 (b-2) | 3.6 | 3.6 | 3.6 | 3.6 | 3.3 | 4.1 | 4.0 | 3.6 |
|  |  | TFMB | — | — | — | — | — | — | — | — |
|  | Polyorganosiloxane unit content [mass %] |  | 20 | 20 | 20 | 20 | 20 | 20 | 20 | 20 |
| Film evaluation | Film thickness [μm] |  | 9.2 | 8.8 | 8.6 | 8.3 | 10.2 | 9.7 | 9.6 | 9.6 |
|  | Total light transmittance [%] |  | 89.7 | 89.7 | 89.6 | 89.7 | 89.9 | 89.6 | 89.5 | 89.8 |
|  | YI |  | 4.4 | 2.7 | 3.1 | 2.2 | 3.3 | 2.3 | 3.4 | 4.00 |
|  | Tg (° C.) |  | 273 | 247 | 240 | 240 | 274 | 275 | 300 | 271 |
|  | Rth [nm] |  | 57 | 48 | 49.3 | 43.7 | 46.5 | 23 | 24.4 | 16 |
|  | Rth (10 um converted) [nm] |  | 62 | 55 | 57 | 53 | 46 | 23 | 25 | 50 |
|  | Residual stress [MPa] |  | 18 | 17 | 17 | 17 | 17 | 21 | 22 | 19 |

TABLE 4

|  |  |  | Comparative Example 1 | Comparative Example 2 | Comparative Example 3 | Comparative Example 4 | Comparative Example 5 |
|---|---|---|---|---|---|---|---|
| Polyami acid/polyimide composition | Tetracarboxylic acid component [mol %] | s-BPDA (a-1-1s) | 100 | 50 | — | 100 | — |
|  |  | a-BPDA (a-1-1a) | — | — | — | — | — |
|  |  | s-ODPA (a-1-2s) | — | — | — | — | — |
|  |  | TAHQ (a-2-1) | — | — | 100 | — | 100 |
|  |  | TMPBP-TME (a-2-2) | — | 50 | — | — | — |
|  |  | CBDA (a-3) | — | — | — | — | — |
|  |  | BPAF (a-4) | — | — | — | — | — |
|  | Diamine Component [mol %] | 6FODA (b-1) | 100 | 100 | 100 | — | — |
|  |  | X-22-1660B-3 (b-2) | — | — | — | 1.56 | 1.98 |
|  |  | TFMB | — | — | — | 98.44 | 98.02 |
|  | Polyorganosiloxane unit content [mass %] |  | 0 | 0 | 0 | 10 | 10 |
| Film evaluation | Film thickness [μm] |  | 10 | 10 | 10 | 6.6 | 7.2 |
|  | Total light transmittance [%] |  | 88.73 | 89.96 | 89.1 | 88.23 | 87.34 |
|  | YI |  | 7.9 | 3.5 | 3.8 | 4.74 | 6.53 |
|  | Tg (° C.) |  | 268 | 290 | 241 | 300 | 245 |
|  | Rth [nm] |  | 163 | 81.8 | 155.4 | 360.1 | 932.4 |
|  | Rth (10 um converted) [nm] |  | 163 | 81.8 | 155.4 | 546 | 1295 |
|  | Residual stress [MPa] |  | 34.6 | 36.7 | 25.4 | 20.8 | 14 |

As shown in Table 1 to 3, the polyimide film of Examples 1 to 20 produced using a particular tetracarboxylic acid component and a specific diamine component exhibited excellent transparency and excellent low retardation and low residual stress.

The invention claimed is:

1. A polyimide resin comprising:
a structural unit A derived from a tetracarboxylic dianhydride and a structural unit B derived from diamine, wherein
the structural unit A includes at least one structural unit selected from the group consisting of a structural unit (A-1) derived from a compound represented by Formula (a-1) and a structural unit (A-2) derived from a compound represented by Formula (a-2),

[Chem. 1]

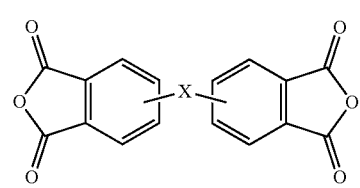

(a-1)

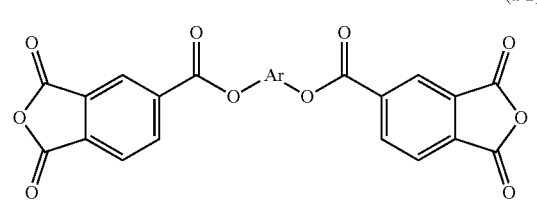

(a-2)

where X represents a single bond or an oxygen atom, and Ar represents a substituted or unsubstituted arylene group; and the structural unit B includes a structural unit (B-1) derived from a compound represented by Formula (b-1) and includes a structural unit (B-2) derived from a compound represented by Formula (b-2),

[Chem. 2]

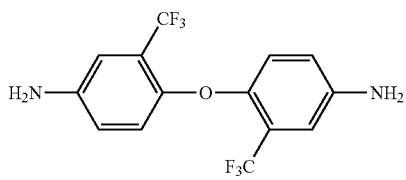
(b-1)

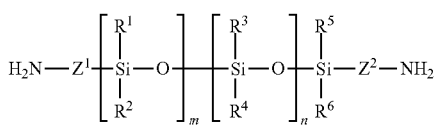
(b-2)

where $Z^1$ and $Z^2$ each independently represent a divalent aliphatic group or a divalent aromatic group, $R^1$ and $R^2$ each independently represent a monovalent aromatic group or a monovalent aliphatic group, $R^3$ and $R^4$ each independently represent a monovalent aliphatic group, $R^5$ and $R^6$ each independently represent a monovalent aliphatic group or a monovalent aromatic group, m and n each independently represent an integer of 1 or greater, and a sum of m and n represents an integer from 2 to 1000, and at least one of $R^1$ and $R^2$ represents a monovalent aromatic group.

2. The polyimide resin according to claim 1, wherein the structural unit (A-1) includes at least one structural unit selected from the group consisting of a structural unit derived from a compound represented by Formula (a-1-1), and a structural unit derived from a compound represented by Formula (a-1-2);

[Chem. 3]

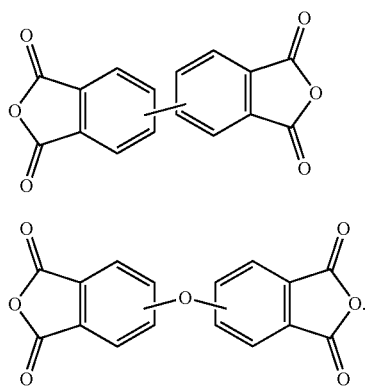

(a-1-1)

(a-1-2)

3. The polyimide resin according to claim 1, wherein the structural unit (A-2) includes at least one structural unit selected from the group consisting of a structural unit derived from a compound represented by Formula (a-2-1), and a structural unit derived from a compound represented by Formula (a-2-2);

[Chem. 4]

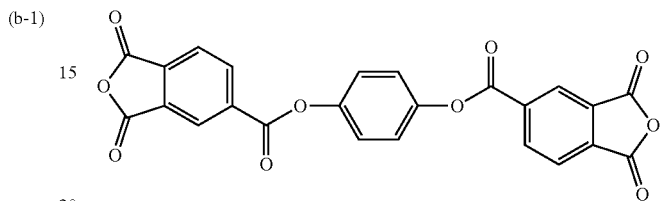
(a-2-1)

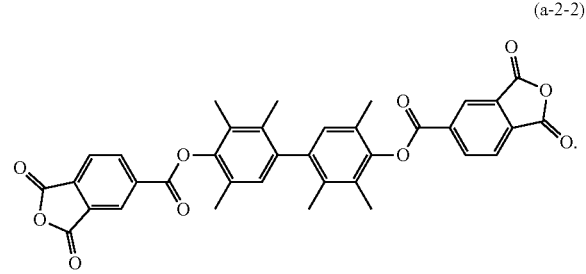
(a-2-2)

4. The polyimide resin according to claim 1, wherein a content of a polyorganosiloxane unit with respect to a total of the structural unit A and the structural unit B is from 5 to 45 mass %.

5. The polyimide resin according to claim 1, wherein a ratio of the structural unit (B-2) in the structural unit B is from 0.01 to 15.0 mol %.

6. The polyimide resin according to claim 1, wherein a sum of m and n in the Formula (b-2) is an integer from 3 to 500.

7. The polyimide resin according to claim 1, wherein the structural unit A includes a structural unit (A-3) derived from a compound represented by Formula (a-3);

[Chem. 5]

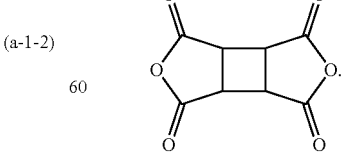
(a-3)

8. The polyimide resin according to claim 1, wherein the structural unit A includes a structural unit (A-4) derived from a compound represented by Formula (a-4);

[Chem. 6]
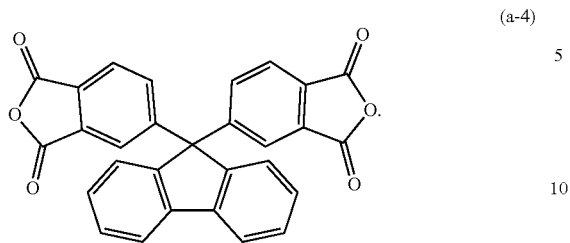
(a-4)
9. A varnish in which polyamic acid, which is a precursor of the polyimide resin described in claim 1, is dissolved in an organic solvent.
10. A polyimide film comprising the polyimide resin described in claim 1.
\* \* \* \* \*